United States Patent [19]

Baker

[11] 4,378,954
[45] Apr. 5, 1983

[54] METHOD OF MAKING OPTICAL FIBER TERMINATION

[75] Inventor: James C. Baker, Highfield, England

[73] Assignee: ITT Industries, Inc., New York, N.Y.

[21] Appl. No.: 113,378

[22] Filed: Jan. 18, 1980

[30] Foreign Application Priority Data

Jan. 18, 1979 [GB] United Kingdom ................. 7901884

[51] Int. Cl.³ .............................................. G02B 7/26
[52] U.S. Cl. ..................................... 350/320; 156/294; 156/307.1; 350/96.20
[58] Field of Search ............... 350/96.15, 96.18, 96.20, 350/96.21, 320, 96.30, 96.34; 156/293, 294, 307.1

[56] References Cited

U.S. PATENT DOCUMENTS

| | | | |
|---|---|---|---|
| 3,227,032 | 1/1966 | Upton | 350/96.34 X |
| 4,113,346 | 9/1978 | Jackson et al. | 350/96.20 |
| 4,147,402 | 4/1979 | Chown | 350/96.18 |
| 4,220,398 | 9/1980 | Dalgoutte | 350/96.21 |
| 4,304,461 | 12/1981 | Stewart et al. | 350/96.18 |

FOREIGN PATENT DOCUMENTS 2002136  2/1979  United Kingdom ............. 350/96.18

OTHER PUBLICATIONS

Bedgood et al., "Demountable Connectors for Optical Fiber Systems," *Elect. Commun.*, vol. 51, No. 2, Apr.-Jun. 1976, pp. 85-91.

Nicia, "Practical Low-Loss Lens Connector for Optical Fibres," *Electr. Letters*, vol. 14, No. 16, Aug. 1978, pp. 511-512.

*T&B/Telecom*, Tech. Data Sheet TL-1, "Narrow Profile Splice for 125 to 140 Micron O.D. Optical Waveguides," Jun. 1979, 2 pages.

*Primary Examiner*—John D. Lee

[57] ABSTRACT

An optical fiber termination of the expanded beam type in which the fiber end fits into one end of a glass ferrule whose other end is closed by a spherical lens. The ferrule is filled with an ultra-violet curing glue. The position of the fiber end is adjusted so that light from the fiber leaves the lens as a collimated beam and then the glue is cured by ultra-violet light injected, initially, via the lens to cure the glue at the fiber end and lens. Then the rest of the glue is cured by ultra-violet light applied through the wall of the ferrule.

1 Claim, 3 Drawing Figures

METHOD OF MAKING OPTICAL FIBER TERMINATION

BACKGROUND OF THE INVENTION

This invention relates to an optical fiber termination, especially for use in a demountable optical fiber connector, and a method of making such a termination.

In an optical fiber connector, accurate alignment of the fibers to be connected is essential to avoid excessive losses of light. Thus the slightest inaccuracy in this alignment leads, due to the small cross-section of the fibers used to convey the light, to a considerable loss of light. To overcome, or at least to reduce, this difficulty it is known to fix the end of an optical fiber with respect to a lens which, although physically small, is large in diameter compared with the fiber diameter. This lens produces a collimated expanded beam of light whose diameter may be of the order of 0.5 mm—which also is large compared with the diameter of the optical fiber. The beam from one such lens is so aimed as to fall on the lens of the other termination, so that when two such terminations are used to connect the fibers, the radial tolerance due to misalignment of the lens is considerably less tight than the radial tolerance between two fibers which mate directly.

The fiber in such a termination has to be radially and angularly aligned with respect to the lens during manufacture, but the terminations are aligned by the casing in which they are placed. In the case of this latter alignment, radial tolerance is relaxed at the expense of a tightening in the corresponding angular tolerance, so a balance has to be struck. Such terminations in addition to their performance being relatively insensitive to radial misalignment, are not as susceptible to damage by abrasion or to troubles due to the presence of dust.

The object of the present invention is to provide an improved optical fiber termination of the type referred to above, and to provide a method of making such a termination.

SUMMARY OF THE INVENTION

According to one aspect of the present invention, there is provided an optical fiber termination which comprises a tubular ferrule of a transparent material into one end of which there is inserted an optical fiber. A lens closes the other end of the ferrule. The fiber end is disposed at an angular and radial setting position with respect to the lens so that light from the fiber will leave the lens as a collimated beam which is symmetrical with respect to the center axis of the ferrule. An ultra-violet cured glue fills the inside of the ferrule to retain the fiber and the lens in the position with respect to each other.

According to another aspect of the present invention, there is provided a method of manufacturing an optical fiber termination in which the end of an optical fiber is inserted into one end of a tubular ferrule of transparent material. The other end of the ferrule is closed by a spherical lens. The ferrule is filled with a transparent ultra-violet curing glue before or after the fiber end is inserted into the ferrule. Light is passed via the fiber to the lens and the angular and radial setting of the fiber end are adjusted with respect to the lens until the light leaving the lens is a collimated beam which is symmetrical with respect to the center axis of the ferrule. Thereafter, the glue is cured by injecting ultra-violet light into the glue to seal the lens and the fiber end into the ferrule.

DESCRIPTION OF THE PREFERRED EMBODIMENT

The optical fiber to be terminated in the present invention is one which has an inner core of a material such as glass, silica or a doped silica, with a cladding of different glass or a differently doped silica such that this cladding has a lower refractive index than does the core material. Overlying this cladding there is a sheath of a plastic material, e.g., a silicone plastic.

Figure 1:
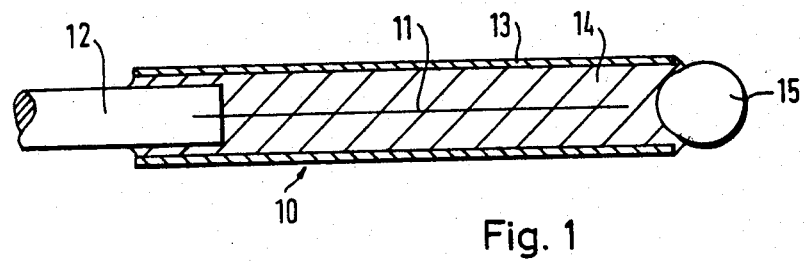
FIG. 1 is a partial longitudinal sectional view of a fiber optic termination according to the present invention.

In the termination shown in FIG. 1, generally designated 10, the optical fiber 11 has its plastic sheath 12 removed from its end so as to expose its glass or silica optical cladding. This unclad fiber end is inserted into a glass ferrule 13. The ferrule is filled with a transparent ultra-violet curing glue indicated at 14, either before or after inserting the fiber end into the ferrule. The front end of the ferrule is closed by a lens 15. Given by way of example only, the distance from the end of the fiber to the lens is of the order of 100 microns; the outside diameter of the plastic sheath 12 is nominally 1 mm; the inside and outside diameters of the ferrule are 1.25 mm and 1.5 mm, respectively; and the lens 15 is a glass sphere with a diameter of 1.5 mm.

Figure 3:
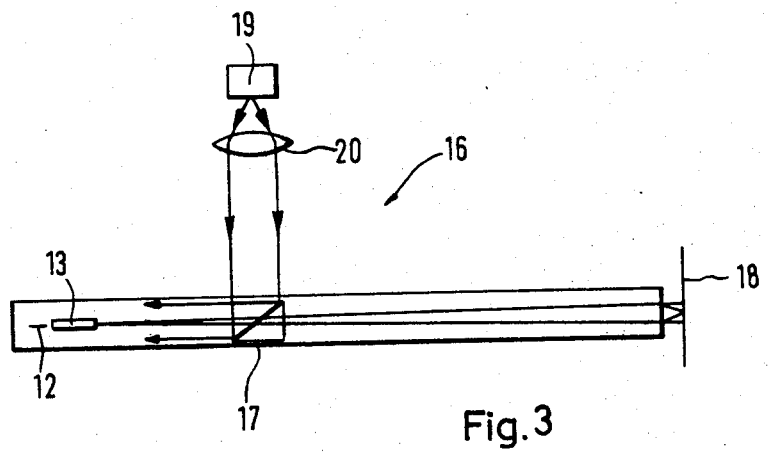
FIG. 3 is a schematic illustration of an optical bench utilized for adjusting the fiber end in the termination shown in FIG. 1.

To ensure that the fiber end is accurately aimed at the center of the lens, the angular and the radial orientation of the fiber are adjusted during manufacture. The adjustment may be performed on the optical bench 16 shown in FIG. 3. To perform the adjustment, light is passed through the fiber with its end in the ferrule 13 and hence through the lens. This light passes via a beam splitter 17 to a screen 18 which may be located a meter or more from the ferrule. The optical fiber is held in a micropositioner (not shown) during this adjustment, and the fiber is so positioned during the adjustment that the beam of light leaving the lens is collimated and symmetrical with respect to the center axis of the ferrule. This condition is detected from the position of the image produced by the beam on the screen 18, which image is a disc, which is relatively large compared with the ferrule dimensions.

When the light is found to be properly collimated, ultra-violet light from an ultra-violet source 19 is injected into the ferrule via a lens 20, the beam splitter 17 and the lens of the ferrule. This cures the glue near to and around the end of the fiber so as to seal the fiber end and the lens in position. The glue becomes opaque to ultra-violet light upon curing. The remaining uncured glue is then cured by gradually exposing the glass ferrule to ultra-violet light by uncovering the ferrule from the end closed by the lens. Thus, there is no tendency for bubbles to be formed by shrinkage of the glue upon curing. When the glue is initially injected into the ferrule, care is taken to ensure that there is a large fillet of glue between the outer sheath 12 and the glass ferrule 13. Thus when the glue contracts during the curing some of this fillet is sucked into the ferrule so that the cladding is still adequately gripped by the glue.

In the above method, the beam splitter serves two purposes. The first is to allow the alignment of the collimated beam to be monitored while the glue is curing. The second is to provide a means to illuminate the fiber symmetrically with respect to the axis of the ferrule, so that the curing is symmetrical and the inevitable shrinkage of the glue upon curing does not tend to disturb the alignment of the fiber end and the lens.

Since the adjustment of the relative positions of the lens and the fiber end is done during manufacture, it can easily be done with a high degree of accuracy and reliability.

Figure 2:
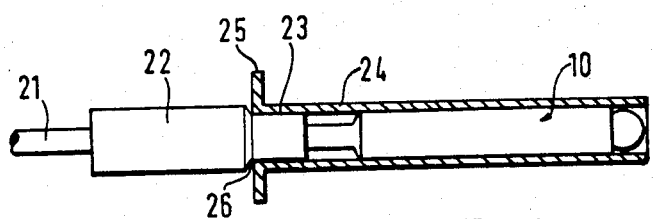
FIG. 2 is a partial longitudinal sectional view of a termination assembly incorporating the termination of FIG. 1.

FIG. 2 shows a termination assembly incorporating the termination 10 of FIG. 1. Here the optical fiber cable 21 of the assembly has a metal sleeve 22 crimped on to it, so as to have a portion of reduced diameter, as shown at 23. The termination 10 on the cable is fitted into a metal ferrule 24 within which it is a snug fit, the dimensions being such that the lens is just "inboard" of the outer end of the ferrule 24. The ferrule 24 has a flange 25 at its inner end for engagement with a shoulder 26 on the sleeve 22 due to the crimp. The elements shown are then secured together. Such a termination assembly can be readily fitted into the contact-receiving aperture of a conventional type connector.

What is claimed is:

1. A method of manufacturing an optical fiber termination comprising the steps of:

inserting an end of an optical fiber into one end of a tubular ferrule of a transparent material, said ferrule having an inner diameter substantially greater than the diameter of said fiber;

closing the other end of said ferrule by a lens;

filling the ferrule with a transparent ultra-violet curing glue before or after said fiber end is inserted into said ferrule;

passing light via said fiber to said lens;

adjusting the angular and radial setting of said fiber end with respect to said lens until the light leaving said lens is a collimated beam which is symmetrical with respect to the center axis of said ferrule;

thereafter curing the glue adjacent to said lens and said fiber end by injecting ultra-violet light into said glue by a beam splitter in the path of said collimated beam to seal said lens and said fiber end into said ferrule so that the collimated beam may be monitored while the glue is curing; and curing the remaining glue in said ferrule by exposing the transparent ferrule to ultra-violet light by successively uncovering the outer cylindrical surface of the ferrule commencing from said other end housing said lens.

* * * * *